(12) United States Patent
Ikeda

(10) Patent No.: US 8,955,116 B2
(45) Date of Patent: Feb. 10, 2015

(54) INFORMATION PROCESSING APPARATUS AND CONTROL METHOD OF THE SAME

(75) Inventor: Atsushi Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/605,634

(22) Filed: Sep. 6, 2012

(65) Prior Publication Data

US 2013/0074182 A1 Mar. 21, 2013

(30) Foreign Application Priority Data

Sep. 15, 2011 (JP) ................................. 2011-201863
Aug. 29, 2012 (JP) ................................. 2012-188787

(51) Int. Cl.
| | | |
|---|---|---|
| *G06F 11/00* | (2006.01) | |
| *G06F 12/14* | (2006.01) | |
| *G06F 12/16* | (2006.01) | |
| *G06F 21/00* | (2013.01) | |

(52) U.S. Cl.
CPC .......... *G06F 21/00* (2013.01); *G06F 2221/033* (2013.01)

USPC .............................................. 726/22; 726/25

(58) Field of Classification Search
CPC ..... G06F 11/34; G06F 11/3409; G06F 21/57; G06F 21/577; G06F 2221/033; G06F 2221/034
USPC ........................................................ 726/22, 25
See application file for complete search history.

(56) References Cited

U.S. PATENT DOCUMENTS

| | | | |
|---|---|---|---|
| 8,356,283 B2 * | 1/2013 | Holden et al. ................ | 717/126 |
| 2010/0077445 A1 | 3/2010 | Schneider | |
| 2011/0047620 A1 * | 2/2011 | Mahaffey et al. .............. | 726/23 |
| 2011/0231817 A1 * | 9/2011 | Hadar et al. .................. | 717/120 |
| 2012/0072991 A1 * | 3/2012 | Belani et al. .................... | 726/25 |

* cited by examiner

*Primary Examiner* — Andrew Nalven
*Assistant Examiner* — Quy Pham
(74) *Attorney, Agent, or Firm* — Canon USA IP Division

(57) ABSTRACT

A device function to be used by an application is specified, a risk level of the specified device function is acquired, and a risk level of the application is calculated based on the acquired risk level of the device function.

9 Claims, 13 Drawing Sheets

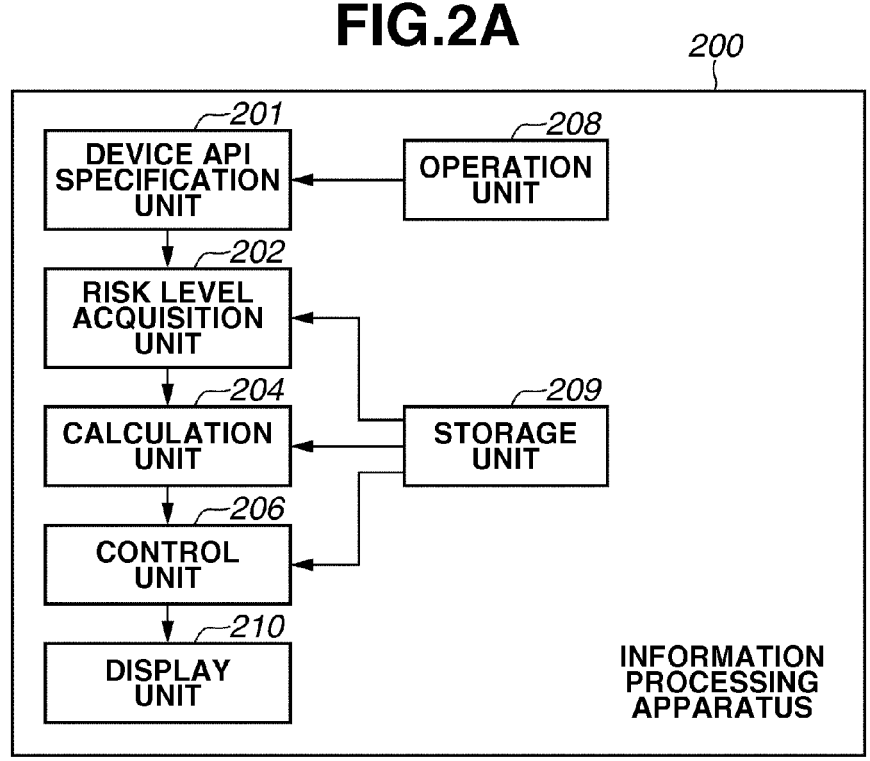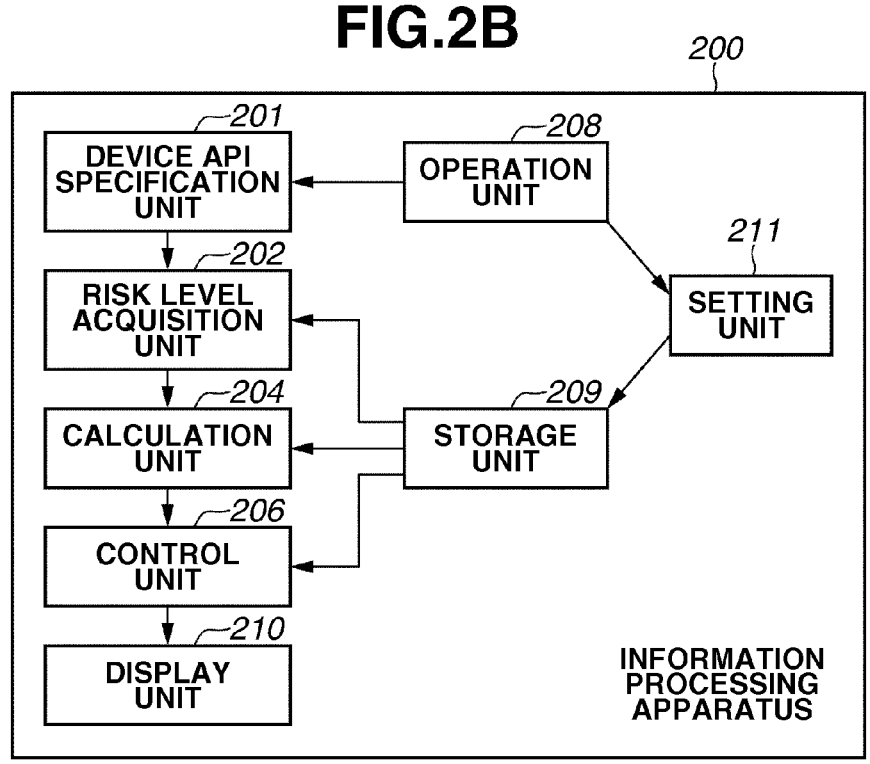

FIG.3A

| Device API | RISK LEVEL |
|---|---|
| deviceapis | — |
| accelerometer | 1 |
| orientation | 1 |
| camera | 2 |
| devicestatus | 2 |
| filesystem | 4 |
| messaging | 4 |
| geolocation | 3 |
| pim | — |
| contact | 5 |
| calendar | 4 |
| task | 4 |
| deviceinteraction | 1 |
| network | 2 |

FIG.3B

| Device API | RISK LEVEL |
|---|---|
| deviceapis | — |
| accelerometer | 1 |
| orientation | 1 |
| camera | 2 |
| devicestatus | 2 |
| filesystem | 4 |
| messaging | 4 |
| geolocation | 3 |
| pim | — |
| contact | 5 |
| calendar | 5 |
| task | 5 |
| deviceinteraction | 1 |
| network | 5 |

FIG.3C

| Device API | EXPLANATION |
|---|---|
| deviceapis | PARENT API OF EACH DEVICE API |
| accelerometer | ACQUIRE INFORMATION ABOUT ACCELERATION SENSOR |
| orientation | ACQUIRE INFORMATION ABOUT AXIS SENSOR |
| camera | OPERATE DEVICE CAMERA |
| devicestatus | ACQUIRE INFORMATION ABOUT DEVICE |
| filesystem | CALL DEVICE FILE SYSTEM |
| messaging | USE E-MAIL FUNCTION |
| geolocation | ACQUIRE INFORMATION ABOUT CURRENT LOCATION |
| pim | ACQUIRE PERSONAL INFORMATION |
| contact | OPERATE ADDRESS BOOK INFORMATION (PIM CHILD API) |
| calendar | OPERATE CALENDAR INFORMATION (PIM CHILD API) |
| task | OPERATE TASK INFORMATION (PIM CHILD API) |
| deviceinteraction | OPERATE VIBRATION AND BACKLIGHT |
| network | EXTERNALLY COMMUNICATE VIA NETWORK |

FIG.3D

| SECURITY PRIORITY ITEM | Device API | ADDED ITEM |
|---|---|---|
| SENSOR | accelerometer | (deviceapis × accelerometer) |
| | orientation | (deviceapis × orientation) |
| CAMERA | camera | (deviceapis × camera) |
| DEVICE INFORMATION | deviceinteraction | (deviceapis × deviceinteraction) |
| | devicestatus | (deviceapis × devicestatus) |
| FILE SYSTEM | filesystem | (deviceapis × filesystem) |
| E-MAIL | messaging | (deviceapis × messaging) |
| LOCATION INFORMATION | geolocation | (deviceapis × geolocation) |
| PERSONAL INFORMATION | contact | (deviceapis × contact) |
| | calendar | (deviceapis × calendar) |
| | task | (deviceapis × task) |
| NETWORK | network | (deviceapis × network) |

| BASIC ITEM |
|---|
| deviceapis |

FIG.4

| TERM | EXPLANATION |
| --- | --- |
| accelerometer RISK LEVEL | POSSIBILITY THAT INFORMATION ABOUT ACCELERATION SENSOR MAY BE READ IN UNAUTHORIZED MANNER |
| orientation RISK LEVEL | POSSIBILITY THAT INFORMATION ABOUT AXIS SENSOR MAY BE READ IN UNAUTHORIZED MANNER |
| camera RISK LEVEL | POSSIBILITY THAT DEVICE CAMERA MAY BE USED TO PERFORM IMAGING AND RECORDING IN UNAUTHORIZED MANNER |
| deviceinteraction RISK LEVEL | POSSIBILITY THAT DEVICE VIBRATION DEVICE OR LIGHT EMITTING DEVICE MAY BE USED IN UNAUTHORIZED MANNER |
| devicestatus RISK LEVEL | POSSIBILITY THAT DEVICE INFORMATION OR NETWORK INFORMATION MAY BE READ IN UNAUTHORIZED MANNER |
| filesystem RISK LEVEL | POSSIBILITY THAT DATA IN FILE SYSTEM MAY BE READ OR REWRITTEN IN UNAUTHORIZED MANNER |
| messaging RISK LEVEL | POSSIBILITY THAT RECEIVED E-MAIL MAY BE READ OR TRANSMITTED IN UNAUTHORIZED MANNER |
| geolocation RISK LEVEL | POSSIBILITY THAT LOCATION INFORMATION MAY BE READ IN UNAUTHORIZED MANNER |
| contact RISK LEVEL | POSSIBILITY THAT ADDRESS BOOK MAY BE REWRITTEN OR READ IN UNAUTHORIZED MANNER |
| calendar RISK LEVEL | POSSIBILITY THAT CALENDAR MAY BE REWRITTEN OR READ IN UNAUTHORIZED MANNER |
| task RISK LEVEL | POSSIBILITY THAT TASK INFORMATION MAY BE REWRITTEN OR READ IN UNAUTHORIZED MANNER |
| pim RISK LEVEL | POSSIBILITY THAT ANY OF CONTACT, CALENDAR, AND TASK SECURITY RISKS ARISES |
| network RISK LEVEL | POSSIBILITY THAT INFORMATION SUCH AS PERSONAL INFORMATION OR LOCATION INFORMATION LEAK VIA THE NETWORK |
| APPLICATION RISK LEVEL | POSSIBILITY THAT ANY OF ABOVE SECURITY RISKS ARISES |

FIG.6A

| SECURITY PRIORITY ITEM FOR APPLICATION | |
|---|---|
| NETWORK<br>EXPLANATION: STRENGTHEN USAGE RESTRICTIONS OF network API | ✓ |
| PERSONAL INFORMATION<br>EXPLANATION: STRENGTHEN USAGE RESTRICTIONS OF pim API | ✓ |
| FILE SYSTEM<br>EXPLANATION: STRENGTHEN USAGE RESTRICTIONS OF filesystem API | ■ |
| E-MAIL<br>EXPLANATION: STRENGTHEN USAGE RESTRICTIONS OF messageing API | ■ |
| CAMERA<br>EXPLANATION: STRENGTHEN USAGE RESTRICTIONS OF camera API | ■ |
| LOCATION INFORMATION | ■ |

FIG.6B

| SECURITY STRENGTH FOR APPLICATION | |
|---|---|
| LOW<br>EXPLANATION: ALLOW APPLICATIONS WITH HIGH RISK LEVEL | ○ |
| MEDIUM<br>EXPLANATION: ALLOW APPLICATIONS WITH MEDIUM OR LOWER RISK LEVEL | ○ |
| HIGH<br>EXPLANATION: ALLOW APPLICATIONS WITH LOW RISK LEVEL | ● |

FIG.6C

| SECURITY STRENGTH | VALUE |
|---|---|
| LOW | 30 |
| MEDIUM | 20 |
| HIGH | 10 |

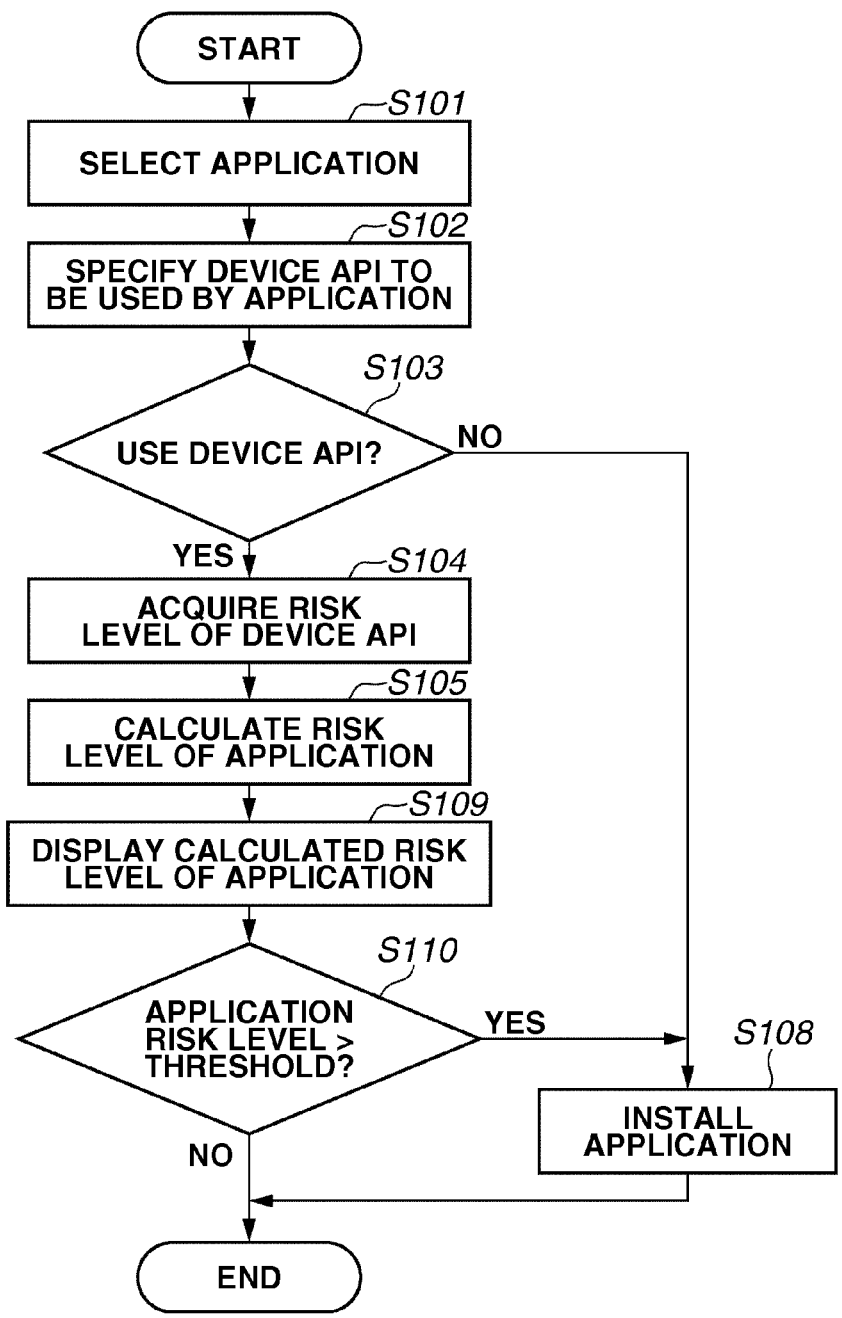

INFORMATION PROCESSING APPARATUS AND CONTROL METHOD OF THE SAME

BACKGROUND OF THE INVENTION

1. Field of the Invention

Aspects of the present invention generally relate to processing for setting an application security policy.

2. Description of the Related Art

An application running on a personal computer (PC), especially on a Web browser, may be configured from Hyper Text Markup Language (HTML) files and JavaScript® files. These applications are also referred to as widgets or Web applications. These applications may be include Cascading Style Sheets (CSS) files, image files, Extensible Markup Language (XML) files, and the like.

Applications configured from HTML files and JavaScript (registered trademark) files are now not only used on PCs, but also on various devices as well. The framework for delivering applications to a device via an applications store has been set by the Wholesale Applications Community (WAC) as a standard specification.

Applications configured from HTML and JavaScript® can contain functions that make a device-specific function be called up from JavaScript® code. The standard specification for calling up a device-specific function from JavaScript® code is set by the World Wide Web Consortium (W3C) standard-setting organization. This function is also referred to as a Device application programming interface (API). In addition, a similar specification to device API has also been formulated by WAC.

There are many different types of device APIs. For example, there is an API for managing personal information, an API for acquiring position information about a device, an API for external communication via a network, and the like. The fact that an application can utilize a device-specific function increases the scope of functions that can be realized by the application.

However, the device API specification increases the security risk for device applications. For example, if an application uses an API that externally communicates via a network with an API that accesses personal information, there is a risk that the personal information of the device owner could be compromised.

Under the WAC framework, management of the security of applications that use device APIs can be performed by employing a security policy. United States Patent Application Publication No. 2010/0077445 discusses a method that uses a dedicated application and a dedicated server as a method for managing the security of applications with use of the security policy. The method discussed in United States Patent Application Publication No. 2010/0077445 stores application evaluations in the dedicated server, and a management application compares the application evaluation with a predetermined threshold to determine resources that an application can access.

However, since the method discussed in United States Patent Application Publication No. 2010/0077445 performs the determination based on the application evaluation, the resources that the application can access are determined even if the risk level of the device APIs (device functions) used by the application is dangerous.

SUMMARY OF THE INVENTION

Aspects of the present invention relate to a technique that determines a security policy of an application in consideration of a risk level of a device function used by the application.

According to an aspect of the present invention, an information processing apparatus includes a specification unit configured to specify a device function to be used by an application, an acquisition unit configured to acquire a risk level of the specified device function, a calculation unit configured to calculate a risk level of the application from the acquired risk level of the device function, and a control unit configured to control whether to install the application based on the risk level of the application and a threshold.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B are block diagrams of an information processing apparatus.

FIGS. 3A to 3D illustrate examples of risk level tables.

FIG. 4 is a table of terms relating to risk levels.

FIGS. 6A to 6C illustrate examples of user interfaces for setting security items.

FIG. 9 is a flowchart illustrating processing performed in an information processing apparatus according to a modification of the first exemplary embodiment.

DESCRIPTION OF THE EMBODIMENTS

Figure 1:
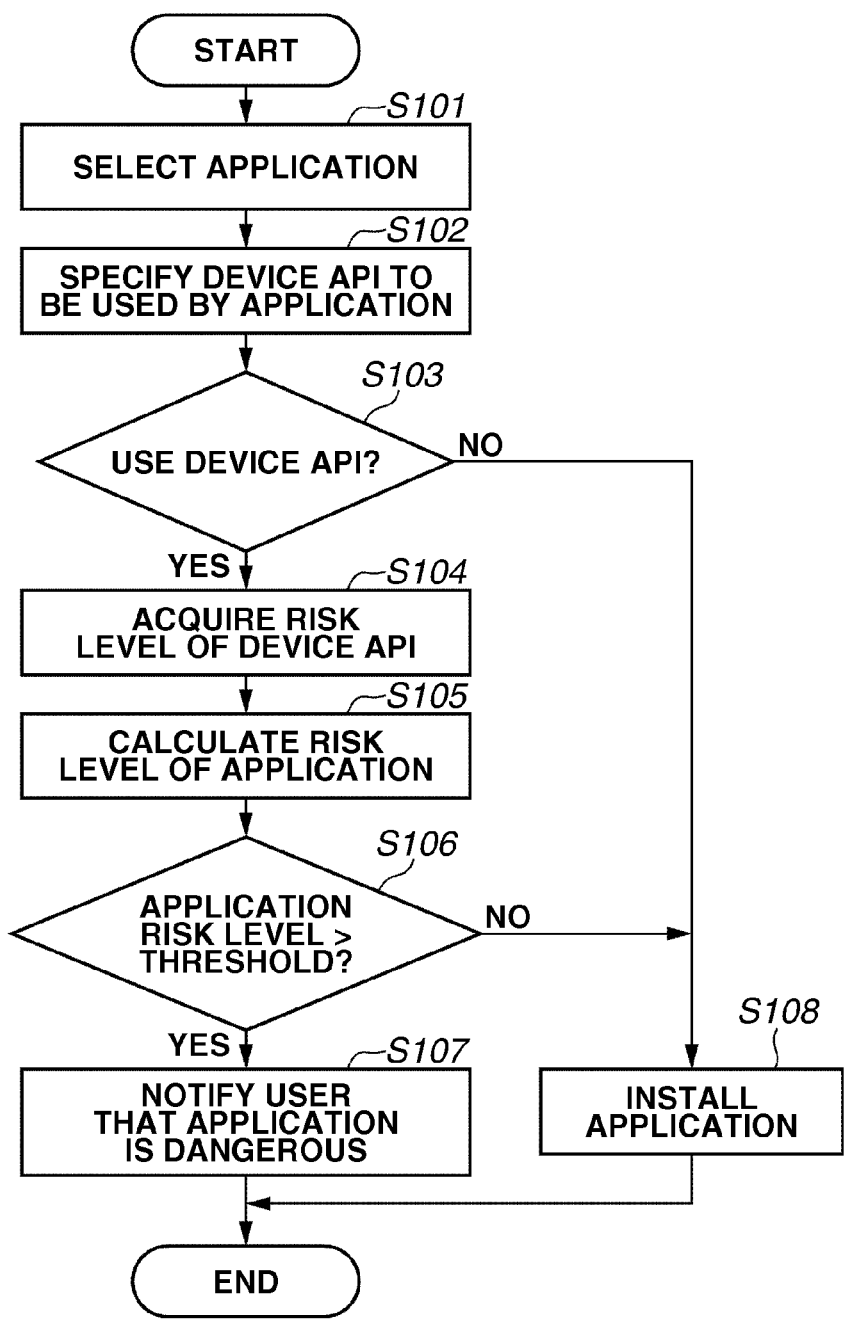
FIG. 1 is a flowchart illustrating processing performed in an information processing apparatus according to a first exemplary embodiment.

Various exemplary embodiments, features, and aspects of the invention will be described in detail below with reference to the drawings.

Not all of the combinations of the characteristics described in the exemplary embodiments are essential for solving means of the present invention. Further, structures having the similar configuration are denoted with the same reference numeral.

In a first exemplary embodiment, an example will be described in which a user installs a widget application in a device.

The term widget used here refers to an application format defined by the W3C or the WAC. A widget has a package form and includes a setting file written in XML and an HTML file as content. In addition, the widget may include JavaScript® files, CSS files, image files, and the like. The setting file written in XML is referred to by the W3C and WAC as "config.xml".

Figure 7:
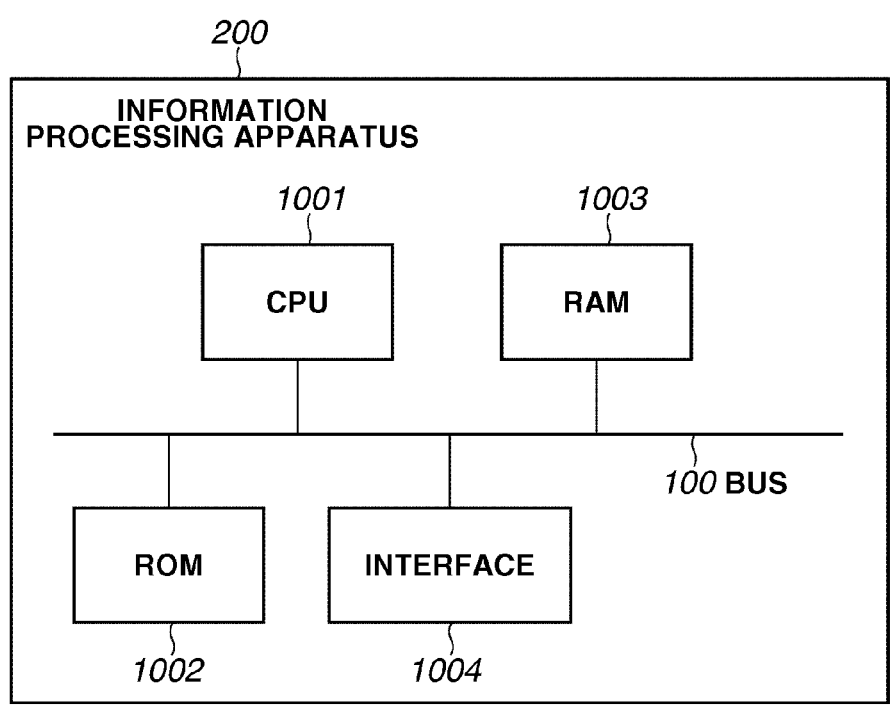
FIG. 7 is a block diagram illustrating an example of a hardware configuration of a computer that can be applied as an information processing apparatus.

The configuration of a computer apparatus that can be applied as an information processing apparatus according to the present exemplary embodiment will be described with reference to a block diagram in FIG. 7. As illustrated in FIG. 7, an information processing apparatus 200 includes a central processing unit (CPU) 1001 that controls the entire information processing apparatus 200, a read-only memory (ROM) 1002 for storing programs and parameters that do not need to be changed, a random access memory (RAM) 1003 for temporarily storing programs and data to be supplied from an external device or the like. The information processing apparatus 200 further includes an interface 1004 for displaying stored data and supplied data, and a system bus 1005 that communicably connects the respective units from 1001 to 1004.

The information processing apparatus 200 may also include an interface with an input device, such as a pointing device like a mouse or a keyboard, for receiving operations from a user and inputting data. Further, the information processing apparatus 200 can also include a hard disk and a memory card fixedly installed therein. Alternatively, the information processing apparatus 200 may include a detachable external storage device that includes an optical disk, such as a flexible disk or a compact disk (CD), a magnetic or optical card, an integrated circuit (IC) card, a memory card, and the like. In addition, the information processing apparatus 200 can include a network interface for connecting to a network circuit, such as the Internet.

FIG. 2A is a block diagram of the information processing apparatus 200 according to the first exemplary embodiment. FIG. 1 is a flowchart illustrating processing performed in the information processing apparatus 200 according to the first exemplary embodiment.

In FIG. 1, first, in step S101, the user selects an application that the user wishes to install with an operation unit 208. A device API specification unit 201 acquires a usage declaration for the device APIs (device functions) used by the application.

Then, in step S102, the device API specification unit 201 specifies the device APIs used by the application by acquiring a list of the device APIs that the application uses from the acquired usage declaration. In the W3C specification and the WAC specification, a device API usage declaration is described in "config.xml".

Next, in step S103, the device API specification unit 201 determines whether the application uses the device APIs. In step S103, if a device API is included in the list acquired in step S102, it is determined that the application uses that device API (YES in step S103).

In step S103, if it is determined that the application does not use the device API (NO in step S103), the processing proceeds to step S108. In step S108, a control unit 206 determines that the application is safe, and installs the application.

If it is determined in step S103 that the application uses the device API (YES in step S103), the processing proceeds to step S104. In step S104, a device API risk level acquisition unit 202 acquires the risk level of the device APIs used by the application. In step S104, the risk level acquisition unit 202 acquires the risk level of the device APIs specified in step S102. A storage unit 209 stores a risk level table in advance. The risk level acquisition unit 202 acquires the device API risk levels from the risk level table stored in the storage unit 209.

FIG. 3A is an example of a risk level table. The risk level table indicates each device API and the risk level for that API. The risk level represents a security risk level, in which the higher the number, the more dangerous the threat. In the present exemplary embodiment, although the term risk level is used, "risk level" is equivalent to security risk level.

FIG. 3C illustrates what kind of device API each device API is. A description of the terms relating to the risk level of the various device APIs is given in FIG. 4.

In step S105, a calculation unit 204 calculates the risk level of the application using the risk level of the device APIs acquired in step S104 and a calculation formula.

An example of a calculation formula according to the present exemplary embodiment is described as Formula 1-1. Formula 1-1 indicates a case in which, among the device APIs, the risk level of an API that communicates externally via a network is considered to be especially high. The calculation formulas are stored in the storage unit 209. In the present exemplary embodiment, the storage unit 209 stores the following:

$$\text{Application risk level} = \text{deviceapis risk level} + (\text{deviceapis risk level} \times \text{network risk level}) \quad \text{(Formula 1-1)}$$

$$\text{deviceapis risk level} = \text{MAX (accelerometer risk level, orientation risk level, camera risk level, devicestatus risk level, filesystem risk level, messaging risk level, geolocation risk level, pim risk level, deviceinteraction risk level)} \quad \text{(Formula 1-2)}$$

$$\text{pim risk level} = \text{MAX (contact risk level, calendar risk level, task risk level)} \quad \text{(Formula 1-3)}$$

The deviceapis risk level in Formula 1-1 is derived from Formula 1-2. The pim risk level in Formula 1-2 is derived from Formula 1-3.

In the calculation formula of Formula 1-1, the network API risk level is treated as an independent item to increase the ratio of the network API risk level in the calculation result. Further, the deviceapis API risk level in Formula 1-1 is a maximum value from the risk levels of nine device APIs. This is because in the WAC specification, the deviceapis API, and the accelerometer to deviceinteraction APIs are defined as a parent API and child APIs. Similarly, the pim API and each of the contact API, the calendar API, and the task API have a parent-child relationship in the WAC specification. Consequently, the pim API risk level is taken as the maximum value of the contact API to task API risk levels.

In step S106, the control unit 206 compares the application risk level calculated by the calculation unit 204 with a predetermined threshold. The predetermined threshold indicates an application security limit value, which is stored in advance in the storage unit 209. If it is determined in step S106 that the application risk level is less than the predetermined threshold (NO in step S106), the processing proceeds to step S108. In step S108, the control unit 206 determines that the application is safe, and installs the application.

On the other hand, if it is determined in step S106 that the application risk level is greater than or equal to the predetermined threshold (YES in step S106), the control unit 206 determines that the application is dangerous, and the processing proceeds to step S107. In step S107, the control unit 206 does not install the application, and notifies the user that the application is dangerous. The notification is issued by displaying a message that the application is dangerous on a display unit 210.

An example illustrating an application of the present exemplary embodiment will now be described.

First, an example of an address book backup application will be considered. A function of an address book backup application is to store an address book recorded in a device on a server on a network. The necessary device APIs for the application function are specified as the contact API for accessing the address book, and the network API for using the network. The risk level for the address book backup application is calculated based on Formula 1-1 from the contact API risk level and the network API risk level.

Next, an example of an imaging application including position information will be considered. A function of an imaging application including position information is to provide a photograph with the position information of when the photograph was taken. The necessary device APIs for the application function are specified as the geolocation API for accessing position information and the camera API for using a camera. The risk level for the imaging application including position information is calculated based on Formula 1-1 from the geolocation API risk level and the camera API risk level.

In step S102, a usage declaration is utilized to acquire a list of the device APIs used by the application. The operation can also be performed without utilizing the usage declaration by searching a JavaScript® code included in the application for a character string that matches a device API. In this case, the search is performed by acquiring the JavaScript® code from the application, and searching the JavaScript® code for whether there is a character string matching the device API. If there is a matching character string, the device API used by the application can be acquired.

In the above-described first exemplary embodiment, whether to install the application is determined using a threshold. In a first modification of the first exemplary embodiment, an example will be described in which a user determines whether to install the application after being notified about the application risk level.

FIG. 9 is a flowchart illustrating processing performed in the information processing apparatus 200 according to the first modification of the first exemplary embodiment. Other than steps S109 and S110, the processing is the same as that in the first exemplary embodiment, and thus a redundant description is omitted herein.

In step S109, the control unit 206 displays the application risk level calculated in step S105 on the display unit 210.

In step S110, the control unit 206 determines whether the operation unit 208 has received an instruction to install the application. If it is determined in step S110 that an instruction to install the application has been received (YES in step S110), the processing proceeds to step S108. In step S108, the control unit 206 installs the application. If it is determined that an instruction to install the application has not been received (NO in step S110), the control unit 206 finishes the processing in flowchart.

In the first exemplary embodiment, an example is described in which the risk level table, the calculation formulae, and the threshold are set in advance and stored in the storage unit 209. In a second exemplary embodiment, a case will be described in which a user can change any of the risk level table, the calculation formulae, and the threshold via the operation unit 208. In the second exemplary embodiment, information relating to the application security necessary for determining the application risk level, such as the risk level table, the calculation formulae, and the threshold, will be referred to as security items. FIG. 2B illustrates a configuration according to the second exemplary embodiment.

More specifically, an example will be described in which the user increases an influence degree of a device API that the user wishes to take particular care with in the determination of the risk of an application, like the network API in the first exemplary embodiment. An example will be described in which the user increases the security strength of a device application.

The processing flow for determining the risk of an application in the second exemplary embodiment is the same as in FIG. 1. However, before the processing in step S101, the user performs processing to change a security item for a device application.

Figure 5A:
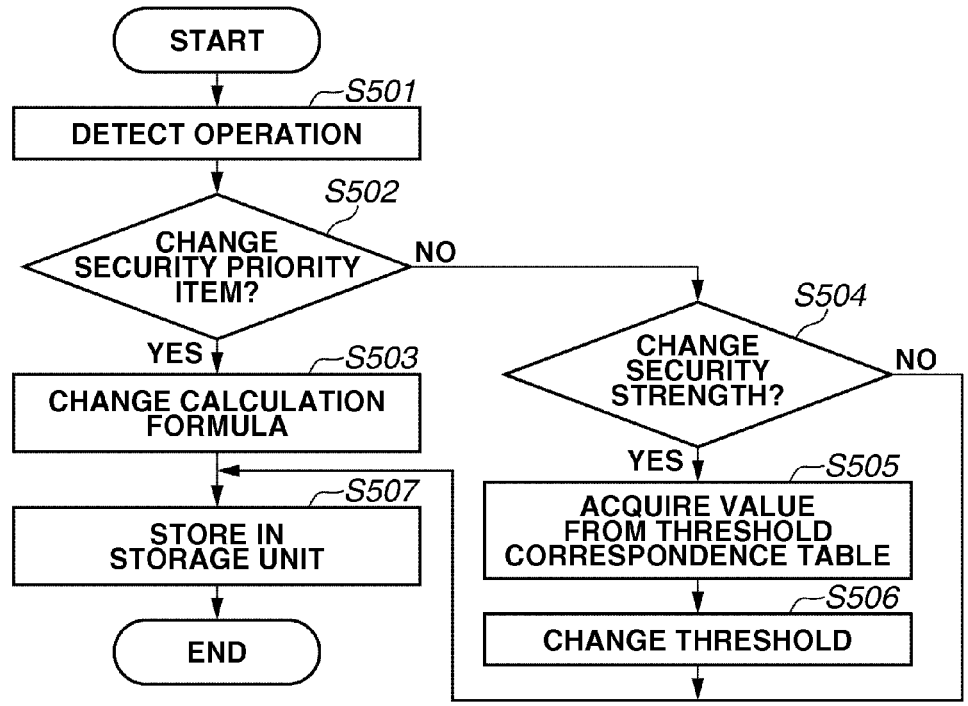
FIGS. 5A and 5B are flowcharts illustrating security item change according to a second exemplary embodiment.

FIG. 5A is a flowchart illustrating an example of the processing performed when a user changes a security item for the device application. In step S501, a setting unit 211 detects a change relating to security performed by the user with the operation unit 208. The user operations are performed via the operation unit 208 illustrated in FIG. 2B.

An example of a user interface for determining a security priority item for an application is illustrated in FIG. 6A. As illustrated in FIG. 6A, a security priority item is used for selecting the function whose security strength the user especially wishes to increase from among the application functions. FIG. 6A illustrates network, personal information, file system, E-mail, camera, and current position information as examples of this function (security priority item).

FIG. 3D illustrates security priority items and corresponding device APIs. In this example, to facilitate selection by the user, the user interface is configured to allow the user to select a security priority item for a group of related device APIs rather than selecting a function whose security strength the user wishes to increase for each device API.

In step S502, the setting unit 211 determines whether the operation performed by the user is a change of a security priority item. If it is determined that the user has changed a security priority item (YES in step S502), the processing proceeds to step S503. In step S503, the setting unit (change unit) 211 changes the calculation formula.

An operation example will now be described with reference to FIG. 6A. First, the user selects the function (security priority item) whose security strength the user wishes to increase on the screen illustrated in FIG. 6A. In the second exemplary embodiment, a case will be considered in which, in addition to network communication, the user wishes to take particular care with management of personal information. In FIG. 6A, two items, network communication and personal information, are selected.

Before the user changes the security item, i.e., with the initial device settings, it is assumed that personal information is not checked on the user's security item setting screen. In such a case, functions that access personal information are not considered to be important in the determination of how dangerous an application is. The calculation formula used by the calculation unit 204 at this stage is the calculation formula represented by Formula 1-1.

Figure 5B:
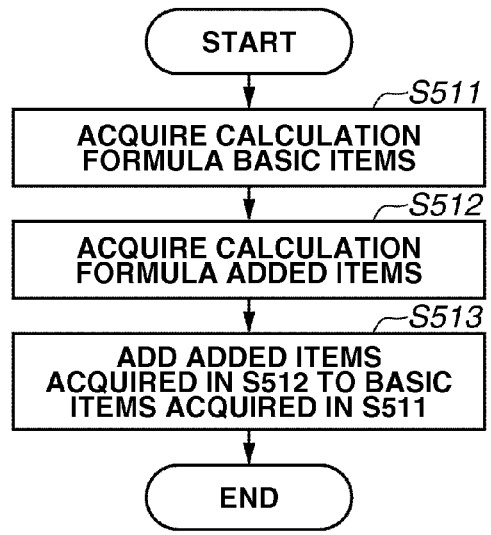

FIG. 5B is a flowchart illustrating the processing in step S503 in detail. This flowchart illustrates an example of the processing for changing the calculation formula. In step S511, the setting unit 211 acquires basic items used in the calculation formula from the storage unit 209. Then, in step S512, the setting unit 211 acquires added items corresponding to the items selected by the user on the security priority item setting screen from the storage unit 209. FIG. 3D illustrates the added items corresponding to the security priority items and the device API basic items, all of which are stored in the storage unit 209.

In the example illustrated in FIG. 6A, the user selects the network and the personal information by placing a check mark next to these items on the security item setting screen. In this case, the obtained added items are (deviceapis×network) and (deviceapis×pim). As described in FIG. 3D, pim is acquired from the maximum value among contact, calendar, and task.

Next, in step S513, the setting unit 211 adds the added items obtained in step S512 to the basic items obtained in step S511. The basic items illustrated in FIG. 3D are deviceapis. Further, the added items are (deviceapis×network) and (deviceapis×pim). Thus, the calculation formula used by the calculation unit 204 changes as shown by Formula 2-1.

Application risk level=deviceapis risk level+(deviceapis risk level×network risk level)+(deviceapis risk level×pim risk level)  (Formula 2-1)

deviceapis risk level=MAX (accelerometer risk level, orientation risk level, camera risk level, devicestatus risk level, filesystem risk level, messaging risk level, geolocation risk level, pim risk level, deviceinteraction risk level)  (Formula 2-2)

pim risk level=MAX (contact risk level, calendar risk level, task risk level)  (Formula 2-3)

The deviceapis risk level in Formula 2-1 is derived from Formula 2-2. Further, the pim risk level in Formula 2-2 is derived from Formula 2-3.

In step S507, the calculation formula changed in step S503 is stored in the storage unit 209.

The processing illustrated in FIG. 5B is still applied when the user selects an item other than the network and the personal information for the security priority item. For example, if file system is selected, from FIG. 3D, the added item obtained in step S512 will be (deviceapis×file system).

There is a plurality of added items corresponding to the security priority items for sensor and device information in FIG. 3D. In such a case, all of the items are added to the basic item. For example, if the user places a check next to the device information on the security item setting screen, the obtained added items will be (deviceapis×deviceinteraction) and (deviceapis×devicestatus). Consequently, both of these two added items are added to the basic item.

In the first exemplary embodiment, the network API risk level is treated as an independent item to increase the ratio of the network API risk level in the calculation result, like in the calculation formula of Formula 1-1. In the second exemplary embodiment, the contact API risk level is treated as an independent item to increase the ratio of the contact API risk level in addition to the network API risk level, like in the formula of Formula 2-1.

In step S502, if it is determined that the user operation does not change a security priority item (NO in step S502), the processing proceeds to step S504. In step S504, the setting unit 211 determines whether the user operation changes the security strength.

In step S504, if it is determined that the user operation changes the security strength (YES in step S504), the processing proceeds to step S505. In step S505, the setting unit 211 acquires a value corresponding to the security strength from a threshold correspondence table. Then, in step S506, the setting unit 211 changes the threshold to the acquired value. In step S507, the setting unit 211 stores the value changed in step S506 in the storage unit 209.

Steps S505 and S506 will now be described based on an example in which the user increases the security strength of a device application. An example of the interface the user uses to change the security strength of a device application is illustrated in FIG. 6B.

In FIG. 6B, the security strength of a device application can be selected from "low", "medium", and "high". In this example, the user has selected "high".

The setting unit 211 acquires from the threshold correspondence table illustrated in FIG. 6C the value corresponding to the "low", "medium", or "high" security strength selected by the user.

In FIG. 6C, the values for "low", "medium", and "high" security strengths are 30, 20, and 10, respectively. If "low" is selected, an application will be determined to be safe if the application risk level is relatively high. On the other hand, if "high" is selected, an application will be determined to be dangerous if the application risk level is relatively low. In the present exemplary embodiment, since "high" is selected, the threshold is 10.

Thus, if the risk level table illustrated in FIG. 3A and the calculation formula of Formula 2-1 are used, the risk levels for applications handling the address book and applications performing network communication substantially increase. By applying the present exemplary embodiment, the security check of an application can be strengthened for a security item whose security the user particularly wishes to increase as a priority.

Figure 8A:
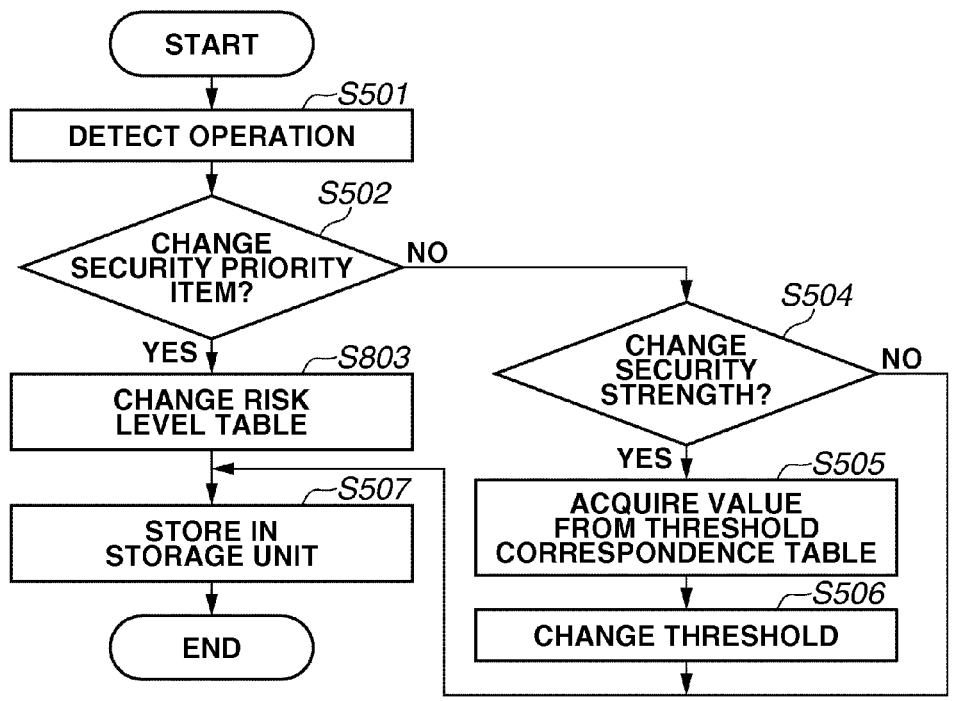
FIGS. 8A and 8B are flowcharts illustrating security item change according to a first modification of the second exemplary embodiment.

In the above-described second exemplary embodiment, the calculation formula is changed to increase the influence degree of a device API whose security the user wishes to increase. As a first modification of the second exemplary embodiment, a processing flow will now be described for changing the risk level table to increase the influence degree of a device API whose security the user wishes to increase. The specific operation examples in the first modification of the second exemplary embodiment are the same as described for the second exemplary embodiment. FIG. 8A illustrates an example of the processing flow according to the first modification. In the processing illustrated in FIG. 8A, other than step S803, the processing is the same as that illustrated in FIG. 5A, and thus a description of those same steps is omitted herein.

The processing in step S803 for changing the risk level table will now be described. In step S803, the setting unit 211 changes the risk level table. The setting unit 211 reads the information from the operation unit 208, and reflects the read information in the risk level table. An example of a method for changing the risk level table so that the risk level of an application using a network API and a pim API is increased will now be described.

Figure 8B:
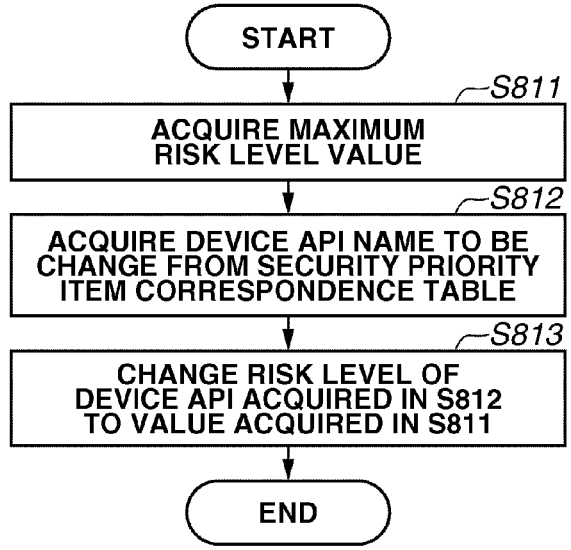

FIG. 8B is a flowchart illustrating the processing in step S803 in detail. In step S811, the setting unit 211 acquires the device API risk level maximum value. The risk level maximum value is a predetermined value that is stored in the storage unit 209. Alternatively, the risk level maximum value may be the maximum value among the risk levels in the risk level table illustrated in FIG. 3A. In the present exemplary embodiment, the risk level maximum value is set as 5.

In step S812, the setting unit 211 acquires the names of the device APIs to be changed from a security priority item correspondence table. The security priority item correspondence table is the same as that illustrated in FIG. 5C.

Next, in step S813, the setting unit 211 changes the risk level of the device API acquired in step S812 to the value acquired in step S811. In the present exemplary embodiment, the value obtained in step S811 is 5. Further, in the present exemplary embodiment, the device API names are network and pim.

Thus, the risk level for the network API and the pim API are both 5. An example illustrating this change is illustrated in FIG. 3B.

In FIG. 3B, the network API risk level has been changed to 5. Further, the contact API, the calendar API, and the task API, which are the child APIs of the pim API, have also each been changed to 5.

Thus, if the risk table illustrated in FIG. 3B and the calculation formula of Formula 1-1 are used, the risk level for applications handling the address book and applications performing network communication substantially increase. By applying the present exemplary embodiment, the security check of an application can be strengthened for a security item whose security the user particularly wishes to increase as a priority.

In the above-described first and second exemplary embodiments, the maximum values of the respective device APIs are used in the calculation formula for calculating an application risk level. A second modification of the second exemplary embodiment will now be described in which the sum of the respective device APIs is used in the calculation formula for calculating an application risk level.

The processing flow for determining how dangerous an application in the second modification of the second exemplary embodiment is the same as in FIG. 1. In the present modification, the calculation formula used by the calculation unit 204 is different for the first exemplary embodiment. The calculation formula used in the second modification is shown in Formula 3-1.

Application risk level=deviceapis risk level+(deviceapis risk level×network risk level)   (Formula 3-1)

deviceapis risk level=SUM (accelerometer risk level, orientation risk level, camera risk level, devicestatus risk level, filesystem risk level, messaging risk level, geolocation risk level, pim risk level, and deviceinteraction risk level)   (Formula 3-2)

pim risk level=SUM (contact risk level, calendar risk level, and task risk level)   (Formula 3-3)

The deviceapis risk level in Formula 3-1 is derived from Formula 3-2. Further, the pim risk level in Formula 3-2 is derived from Formula 3-3. If the calculation formula of Formula 3-1 is used, because the sum of the risk levels of the respective device APIs is obtained, the more types of device API that the application uses, the more dangerous that application is determined to be.

A third modification of the second exemplary embodiment will now be described in which the risk level for a specific security item is not included in the determination of how dangerous an application is.

Among the device APIs defined by the WAC specification, there are APIs that can be considered as having a low danger if combined with any other device API. For example, if the accelerometer API for acquiring acceleration sensor information and the orientation API for acquiring axis sensor information are used in combination with the network API or the content API, the risk level does not increase.

Consequently, in the determination of how dangerous an application is, the user may not wish to consider whether the application uses an accelerometer API or an orientation API. Therefore, a specific device API can be excluded from the determination of how dangerous an application is.

Formulas 4-1 and 5-1 are formulas that exclude the accelerometer API and the orientation API from the calculation formula used by the calculation unit 204.

Application risk level=deviceapis risk level+(deviceapis risk level×network risk level)   (Formula 4-1)

deviceapis risk level=MAX (camera risk level, devicestatus risk level, filesystem risk level, messaging risk level, geolocation risk level, pim risk level, deviceinteraction risk level)   (Formula 4-2)

pim risk level=MAX (contact risk level, calendar risk level, task risk level)   (Formula 4-3)

The deviceapis risk level in Formula 4-1 is derived from Formula 4-2. Further, the pim risk level in Formula 4-2 is derived from Formula 4-3.

Application risk level=deviceapis risk level+(deviceapis risk level×network risk level)   (Formula 5-1)

deviceapis risk level=SUM (camera risk level, devicestatus risk level, filesystem risk level, messaging risk level, geolocation risk level, pim risk level, and deviceinteraction risk level)   (Formula 5-2)

pim risk level=SUM (contact risk level, calendar risk level, and task risk level)   (Formula 5-3)

The deviceapis risk level in Formula 5-1 is derived from Formula 5-2. Further, the pim risk level in Formula 5-2 is derived from Formula 5-3.

Formula 4-1 is a case in which the maximum value is used in the calculation of the parent API risk level. Formula 5-1 is a case in which the sum value is used in the calculation of the parent API risk level. In Formulas 4-1 and 5-1, the risk level of the application does not increase if the accelerometer API and the orientation API are used.

A fourth modification of the second exemplary embodiment will now be described. If the camera API is combined with the messaging API, an application can be created which activates the camera, attaches a photograph taken by the camera to an E-mail, and then sends the E-mail to an arbitrary user. Further, if the filesystem API is combined with the messaging API, an application can be created which attaches an arbitrary file stored on a device to an E-mail and sends the E-mail to an arbitrary user.

As described above, an application having a high risk level can be created by combining a device API handling a file and the messaging API. Further, the risk level may substantially increase for a device API by specific combinations, such as the contact API and the network API.

A formula obtained by changing the calculation formula used by the calculation unit 204 so that the risk level for a device API is substantially increased by a specific combination is shown in Formula 6-1.

Application risk level={MAX(camera risk level+filesystem risk level)×(messaging risk level)}+(pim risk level×network risk level)   (Formula 6-1)

pim risk level=MAX (contact risk level, calendar risk level, task risk level)   (Formula 6-2)

The pim risk level in Formula 6-1 is derived from Formula 6-2.

If the calculation formula of Formula 6-1 is used, the risk level of an application in which two APIs, the device API handling a file and the messaging API, are simultaneously used increases because the risk level of the device API handling a file is multiplied by the risk level of the messaging API. Further, the risk level of an application in which two APIs, the contact API and the network API, are simultaneously used increases because the risk level of the contact API is multiplied by the risk level of the network API.

Figure 10:
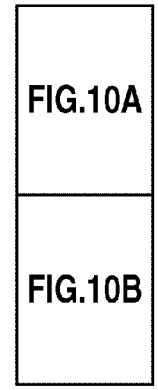
FIG. 10 (including FIGS. 10A and 10B) is a flowchart illustrating processing performed in an information processing apparatus according to a third exemplary embodiment.
Figure 10A:
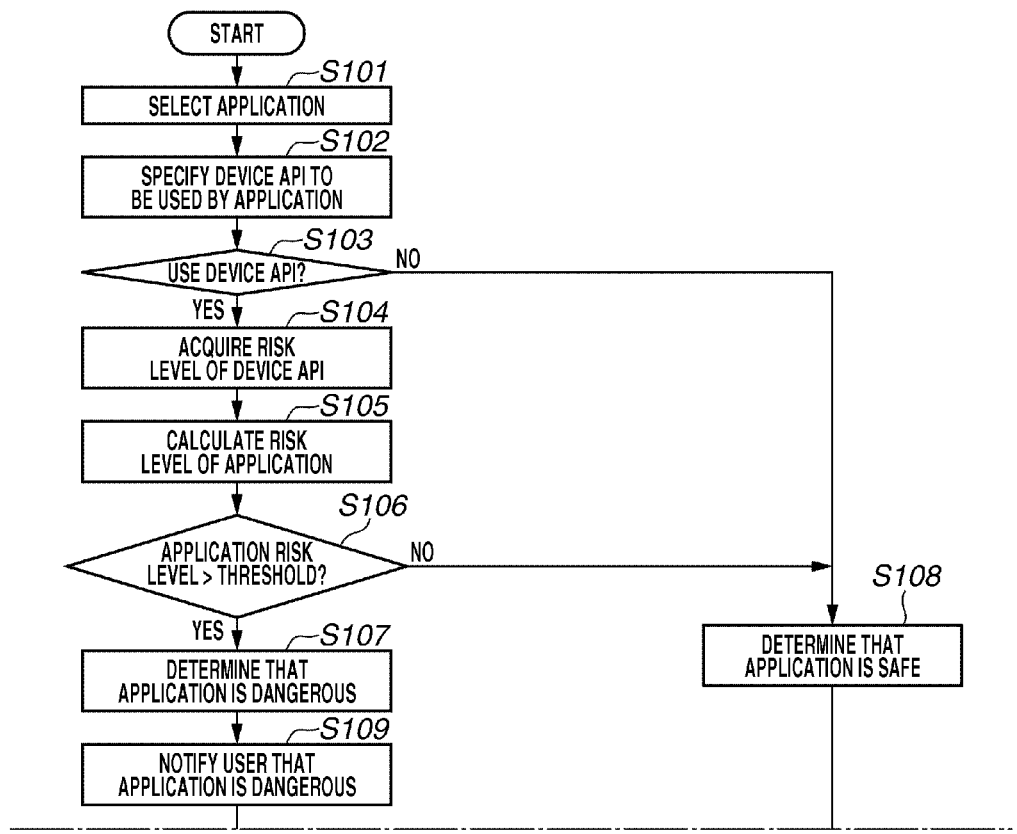
Figure 10B:
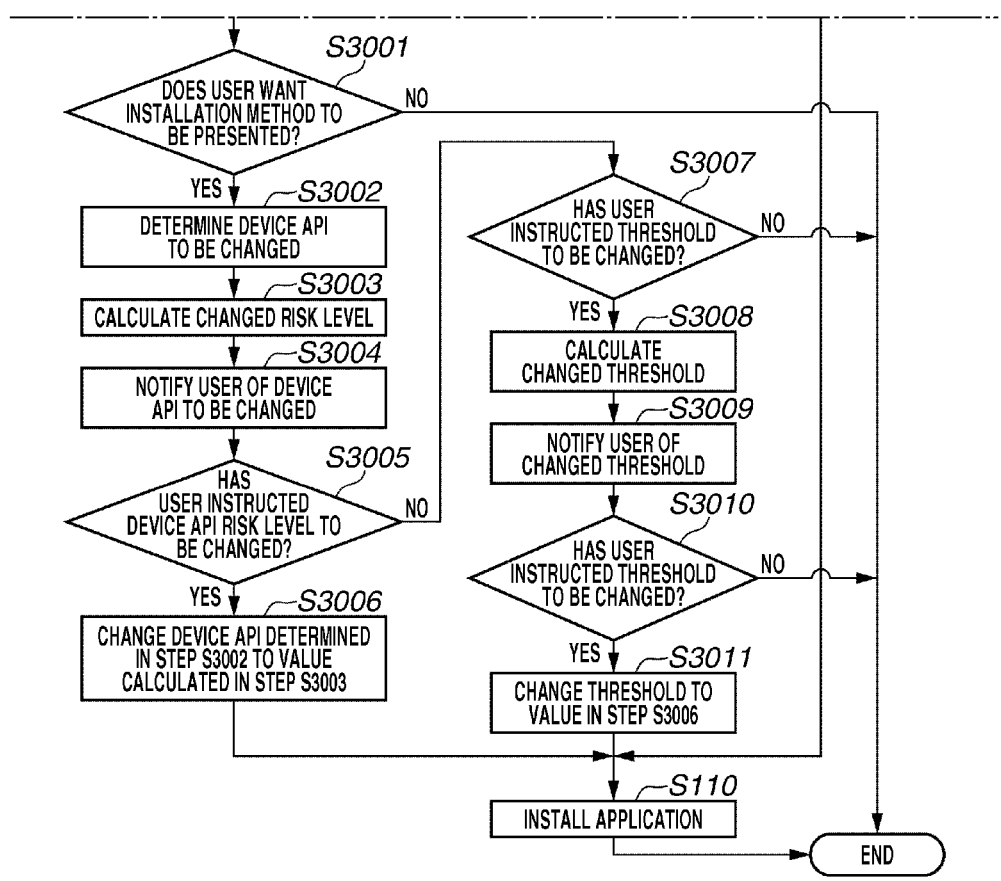

In a third exemplary embodiment, a case will be described in which, when the user wishes to install an application determined to be dangerous, the changes necessary for installing the application are presented to the user. FIG. 10 (including FIGS. 10A and 10B) illustrates a flowchart illustrating processing according to the third exemplary embodiment. The configuration of the third exemplary embodiment is the same as illustrated in FIG. 2B.

More specifically, a case will be described in which, when an application using the camera API and the network API is determined to be dangerous, the changes necessary to install the application are presented to the user. In this example, the user specifies in advance the camera risk level to 4, the network risk level to 5, and the security limit value to 15. In addition, based on Formulae 1-1 to 1-3, the risk level of the application that the user wishes to install is 24.

The processing flow for determining how dangerous an application is in FIG. 10 is similar to the processing flow in FIG. 1. In FIG. 10, the processing from step S109 onwards is different from FIG. 1.

Figure 11A:
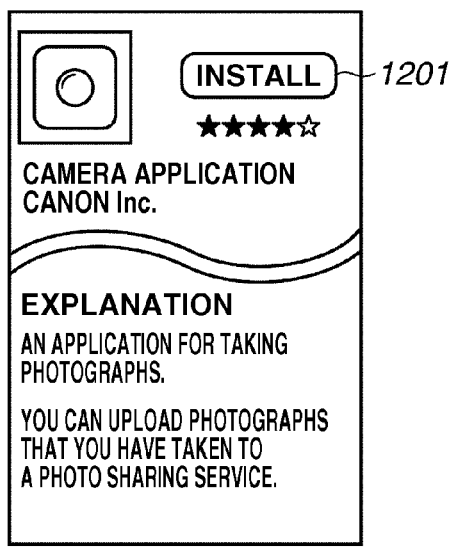
FIGS. 11A to 11C illustrate examples of user interfaces that present modifications of security items.

FIG. 11A illustrates an example of a user interface for prompting a user to install an application. If the user selects an area 1201, the processing in steps S101 to S105 in FIG. 10 is performed. In the present exemplary embodiment, it is assumed that the processing result in step S106 is "Yes", so that after step S106 the processing proceeds to step S107. Then in step S109, the processing for notifying the user that the application the user wishes to install is dangerous is performed. An example of the user interface at this stage is illustrated in FIG. 11B.

Figure 11B:
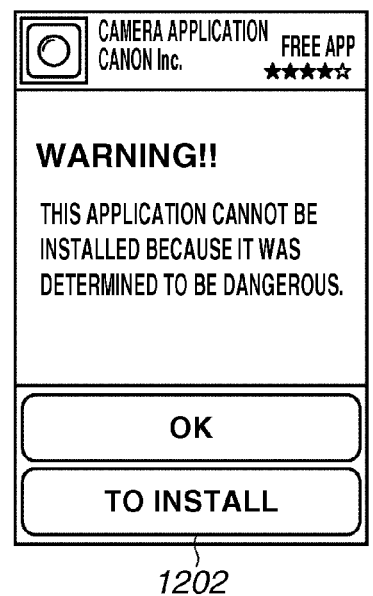

In the present exemplary embodiment, it is assumed that, after the user interface in FIG. 11B has been presented to the user, the user pressed the area 1202. If the user selects the area 1202, in step S3001, it is determined that the user wishes the installation method to be presented (YES in step S3001).

Then, in step S3002, the calculation unit 204 determines the device API to be changed. According to the present exemplary embodiment, all of the device APIs used by the application are enumerated as changing targets. Next, in step S3003, the calculation unit 204 calculates the risk level so that the application is not determined to be dangerous.

The specific processing procedure in steps S3002 and S3003 will now be described. First, the device APIs used by the application to be installed are acquired. In the present exemplary embodiment, these are the camera API and the network API.

First, the change in the camera risk level will be considered. Since the security limit value is 15, the camera risk level is determined so that the application risk level is less than 15. If the determined camera risk level is Cd, based on Formulae 1-2 and 1-3, the deviceapis risk level is also Cd. More specifically, Cd is determined to a value that makes Cd+(Cd×5) less than 15. In this case, the determined Cd is 2.

Next, the change in the network risk level will be considered. Since the security limit value is 15, the network risk level is determined so that the application risk level is less than 15. If the determined network risk level is Nd, based on Formulae 1-2 and 1-3, the deviceapis risk level is 4. In other words, Nd is determined to a value that makes 4+(4×Nd) less than 15. In this case, the determined Nd is 2.

Next, in step S3004, the display unit 210 presents the device API types determined in step S3002 to the user. An example of the user interface at this stage is illustrated in FIG. 11C.

Figure 11C:
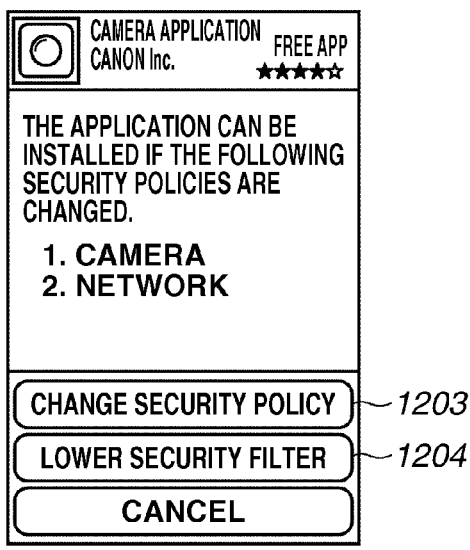

If the user selects an area 1203 after the user interface illustrated in FIG. 11C is presented, in step S3005, the control unit 206 determines that the user instructed the device API risk level to be changed (YES in step S3005). Then, in step S3006, the calculation unit 204 changes the device API determined in step S3002 to the value calculated in step S3003. Finally, in step S110, the control unit 206 installs the application.

If the user selects an area 1204 after the user interface illustrated in FIG. 11C is presented, in step S3005, the control unit 206 does not determine that the user instructed the device API risk level to be changed (NO in step S3005). Then, in step S3007, the control unit 206 determines that the user instructed the security limit value to be changed (YES in step S3007).

Next, in step S3008, the calculation unit 204 determines the security limit value at which the application will not be determined to be dangerous.

The specific processing procedure in step S3008 will now be described. Since the risk level of the application is 24, it should be sufficient to set the security limit value to 25. Therefore, the determined security limit value is 25.

Next, in step S3009, the display unit 210 presents the changed security limit value calculated in step S3008 to the user.

After the processing in step S3009, if the control unit 206 determines in step S3010 that the user instructed the security limit value to be changed (YES in step S3010), the processing proceeds to step S3011. In step S3011, the setting unit 211 changes the application security limit value to the value calculated in step S3008. Finally, in step S110, the control unit 206 installs the application.

If the determination in either of steps S3007 or S3010 is "No", the control unit 206 does not install the application.

Although exemplary embodiments according to the present invention are described above, as already stated, the information processing apparatus may be a general-purpose information processing apparatus such as a common personal computer that can realize the present invention with a computer program running on such a computer. Therefore, it is clear that the scope of the present invention includes a computer program. Further, generally, a computer program is stored on a computer-readable storage medium such as a CD-ROM, and can be executed by setting the storage medium in a drive of the computer and copying or installing the computer program onto the system. Therefore, it is also clear that the scope of the present invention includes such a computer-readable storage medium.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-201863 filed Sep. 15, 2011, and No. 2012-188787 filed Aug. 29, 2012, which are hereby incorporated by reference herein in their entirety.

What is claimed is:

1. An information processing apparatus comprising:
a microprocessor and memory;

a specification unit configured to specify a device function to be used by an application; an acquisition unit configured to acquire a risk level of the specified device function;

a calculation unit configured to calculate a risk level of the application from the acquired risk level of the device function; and a control unit configured to control whether to install the application based on the risk level of the application and a threshold, wherein in a case where the control unit installs the application, the installed application uses the specified device function having the risk level contributing to an acceptable risk level of the installed application and in a case where the control unit doesn't install the application, the control unit causes a display unit to display a message that the application has a high risk level;

a presentation unit configured to present, to a user, a user interface screen to inquire whether the risk level of the specified device function is to be changed or the threshold is to be changed, according to an operation by the user on a user interface item displayed with the message; and a changing unit configured to change the risk level of the specified device function so that the risk level of the application is less than the threshold in a case where an operation by the user on the user interface screen presented by the presentation unit is an instruction to change the risk level of the specified device function, and the changing unit configured to change the threshold to a value larger than the risk level of the specified device function in a case where the operation by the user is an instruction to change the threshold, wherein the control unit is configured to install the application based on the changed risk level of the application and the threshold or the risk level of the application and the chanced threshold.

2. The information processing apparatus according to claim 1, further comprising a setting unit configured to set a device function weighting to be used during calculation by the calculation unit.

3. The information processing apparatus according to claim 1, further comprising a storage unit configured to store a risk level table indicating a risk level of a device function,
wherein the acquisition unit is configured to acquire the risk level of the specified device function from the risk level table.

4. The information processing apparatus according to claim 3,
wherein the storage unit is configured to store a calculation formula for calculating a risk level of an application, and
wherein the calculation unit is configured to calculate the risk level of the application based on the calculation formula and the acquired risk level of the device function.

5. A method for processing information comprising:
specifying a device function to be used by an application;
acquiring a risk level of the specified device function;
calculating a risk level of the application from the risk level of the acquired device function; and
controlling whether to install the application based on the risk level of the application and a threshold,
wherein if the application is installed, the installed application uses the specified device function having the risk level contributing to an acceptable risk level of the installed application and in a case where the application is not installed, a user interface screen that includes a message that the application has a high risk level is displayed on a display unit;
presenting, to a user, the user interface screen to inquire whether the risk level of the specified device function is to be changed or the threshold is to be changed, according to an operation by the user on a user interface item displayed with the message; and
changing the risk level of the specified device function so that the risk level of the application is less than the threshold in a case where an operation by the user on the user interface screen is an instruction to change the risk level of the specified device function, and changing the threshold to a value larger than the risk level of the specified device function in a case where the operation by the user is an instruction to change the threshold,
installing the application based on the changed risk level of the application and the threshold or the risk level of the application and the changed threshold.

6. The method according to claim 5, further comprising setting a device function weighting to be used during calculation.

7. The method according to claim 5, further comprising storing a risk level table indicating a risk level of a device function,
wherein the risk level of the specified device function is acquired from the risk level table.

8. The method according to claim 5, further comprising:
storing a calculation formula for calculating a risk level of an application; and
calculating the risk level of the application based on the calculation formula and the acquired risk level of the device function.

9. A non-transitory computer-readable storage medium storing a computer program for causing a computer to perform a method of processing information comprising:
specifying a device function to be used by an application;
acquiring a risk level of the specified device function;
calculating a risk level of the application from the risk level of the acquired device function; and
controlling whether to install the application based on the risk level of the application and a threshold,
wherein if the application is installed, the installed application uses the specified device function having the risk level contributing to an acceptable risk level of the installed application and in a case where the application is not installed, a user interface screen that includes a message that the application has a high risk level is displayed on a display unit;
presenting, to a user, the user interface screen to inquire whether the risk level of the specified device function is to be changed or the threshold is to be changed, according to an operation by the user on a user interface item displayed with the message; and
changing the risk level of the specified device function so that the risk level of the application is less than the threshold in a case where an operation by the user on the user interface screen is an instruction to change the risk level of the specified device function, and changing the threshold to a value larger than the risk level of the specified device function in a case where the operation by the user is an instruction to change the threshold,
installing the application based on the changed risk level of the application and the threshold or the risk level of the application and the changed threshold.

* * * * *